United States Patent
Schroeder

(10) Patent No.: US 6,641,141 B2
(45) Date of Patent: Nov. 4, 2003

(54) SELF-CONTAINED ANTI-BLOWOUT SEAL FOR FLUIDS OR GASES

(75) Inventor: John W. Schroeder, Orange, CA (US)

(73) Assignee: Bal Seal Engineering, Foothill Ranch, CA (US)

( * ) Notice: Subject to any disclaimer, the term of this patent is extended or adjusted under 35 U.S.C. 154(b) by 1 day.

(21) Appl. No.: 10/137,183

(22) Filed: Apr. 17, 2002

(65) Prior Publication Data

US 2002/0163136 A1 Nov. 7, 2002

Related U.S. Application Data

(60) Provisional application No. 60/284,488, filed on Apr. 18, 2001.

(51) Int. Cl.[7] ................................................. F16J 15/32
(52) U.S. Cl. ........................ 277/552; 277/572; 277/573; 277/576; 277/577
(58) Field of Search .................................. 277/549, 551, 277/552, 558, 564, 565, 566, 567, 568, 569, 572, 573, 576, 577

(56) References Cited

U.S. PATENT DOCUMENTS

| | | | | |
|---|---|---|---|---|
| 3,443,814 A | * | 5/1969 | Dahlheimer | 277/552 |
| 3,497,178 A | * | 2/1970 | Priese | 251/174 |
| 3,610,575 A | * | 10/1971 | Yoneda | 251/315.05 |
| 3,642,248 A | * | 2/1972 | Benware | 251/172 |
| 4,231,578 A | * | 11/1980 | Traub | 277/572 |
| 4,335,887 A | * | 6/1982 | Benassi | 277/557 |
| 4,433,846 A | * | 2/1984 | Romero et al. | 277/551 |
| 4,552,335 A | * | 11/1985 | Alexander et al. | 251/315.05 |
| 5,332,234 A | * | 7/1994 | Forch et al. | 277/576 |
| 6,050,572 A | * | 4/2000 | Balsells et al. | 277/551 |
| 6,161,838 A | * | 12/2000 | Balsells | 277/511 |
| 6,264,205 B1 | * | 7/2001 | Balsells | 277/551 |

* cited by examiner

*Primary Examiner*—Anthony Knight
*Assistant Examiner*—Vishal Patel
(74) *Attorney, Agent, or Firm*—Walter A. Hackler

(57) ABSTRACT

A self contained anti-blowout seal includes a seal jacket having a static seal surface and a dynamic seal lip with a cavity therebetween. A retaining ring is provided and disposed, in part, within a cavity of the seal jacket and proximate the static seal surface for pressing the static seal surface against a mounting surface. The retaining ring includes a surface extending outside the cavity for bearing against a mounting surface and a depending portion is provided which extends over the cavity opening and includes at least one port communicating with the cavity for enabling a sealing medium to enter and exit the cavity as the seal is pressure energized. A biasing element is provided and disposed in the cavity for forcing the dynamic seal lip against a moving member.

18 Claims, 3 Drawing Sheets

SELF-CONTAINED ANTI-BLOWOUT SEAL FOR FLUIDS OR GASES

This application claims benefit of Prov. No. 60/284,488 filed Apr. 18, 2001.

The present invention generally relates to seals for fluid or gaseous media and is more particularly directed to sealing between a static and a dynamic surface in which the dynamic surface engages and disengages the seal while the seal is pressure energized.

Typical seal applications in which a transient surface is sealed includes ball valves, butterfly valves, plug valves, pistons, quick connect couplings and so forth. In such applications, it is difficult to prevent a seal from deforming and/or blowing out due to the rapid change of pressure across the seal. In these applications, there is a need to resist blow-out of the seal which can occur during the time when a piston or other surface moves away from the seal temporarily while residual pressure is still higher in the seal cavity. This can cause a seal to blowout or deformation.

Prior art seal designs used for such conditions have included captivated elastomeric o-rings and seals requiring specialized mounting glands configured to retain both front and rear edges of the seal. In addition, housing of such prior art seals requires a plurality of vent holes in the gland to allow the energizing media to enter and exit the seal cavity. Such seal glands have been large and complex and for most applications are not amenable for retrofitting in existing products.

The present invention is directed to a self-contained seal design with support features to prevent the seal from deforming and/or blowing out under rapid pressure changes due to repeated engagement and disengagement from dynamic sealing surfaces.

SUMMARY OF THE INVENTION

A self-contained anti-blowout seal in accordance with the present invention generally includes a seal jacket having a static seal surface and a dynamic seal lip with a cavity therebetween. The cavity is open to one side of the seal jacket and a retaining ring is provided and disposed, in part, within the cavity and proximate the static seal surface for pressing the static seal surface against a mounting surface.

The retaining ring includes a surface extending outside of the cavity for bearing against the mounting surface and a depending portion extending over the cavity opening. Vent holes in the depending portion provide communication with the cavity for enabling a sealing media to enter and exit the cavity as a seal is pressure energized. A biasing element is disposed in the cavity for forcing the dynamic seal lip against a moving member. This configuration provides for a seal that can experience rapid decompression as the moving member disengages the dynamic seal lip without blowing out or otherwise self-destructing due to residual pressure in the seal.

The seal can be oriented to provide dynamic sealing on an inside diameter, an outside diameter, either as a face seal or at an angle, for example, on a ball valve or partially engaging a surface such as may be used in a butterfly valve. All of these embodiments will be hereinafter described.

More particularly, the retaining ring depending member may include a ledge extending therefrom for engaging the dynamic seal lip for preventing such seal lip blow-out during disengagement of a moving, or sealing, member.

Still more particularly, a snap-in back-up ring may be provided and disposed between a heel portion of the seal jacket and a moving member for preventing the seal lip from bending past the ledge.

A number of biasing elements may be utilized including a canted coil spring, an elastomer o-ring, a spiral strip spring, a leaf spring or a garter spring.

In another embodiment of the present invention, the retaining ring may further comprise a biasing surface for preventing longitudinal movement of the seal and a back-up ring may further comprise a body portion extending outside of the seal jacket for holding the static seal surface against the mounting surface.

BRIEF DESCRIPTION OF THE DRAWINGS

The advantages and features of the present invention would be better understood by the following description when considered in conjunction with the accompanying drawings in which.

DETAILED DESCRIPTION

Figure 1A:
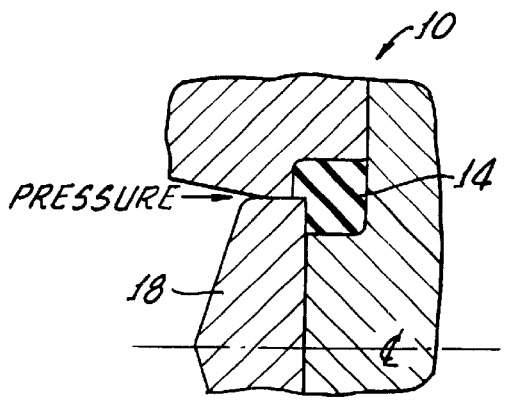
FIG. 1 is a cross sectional view of a prior art o-ring seal illustrating sealing along an axis thereof.
FIG. 1b is a cross sectional view of a prior art o-ring seal showing radial sealing.
FIG. 1c is a cross sectional view of an anti-blowout seal which requires a special mounting gland configured to retain both ends of a sealing lip along with vent holes in the gland to allow an energizing media to enter and exit the seal cavity.
Figure 1B:
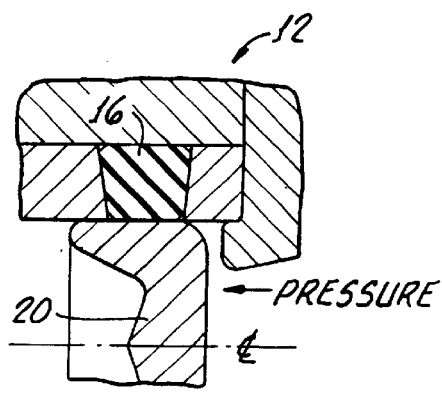

With reference to FIGS. 1a and 1b there is shown seal arrangements 10, 12 utilizing an elastomeric o-ring 14, 16 for providing an axial seal against a moving member 18 or a radial seal against a moving member 20 respectively. These o-rings 14, 16 are subject to distortion and/or blowout when the members 18, 20 disengage the o-rings 14, 16 respectively.

Figure 1C:
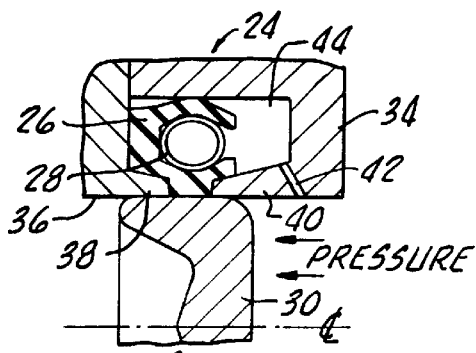

FIG. 1c shows a prior art seal arrangement 24 utilizing a lip seal 26 and a spring 28 force radial sealing against a rotating member 30 which utilizes a specialized mounting gland 34, 36 having flanges 38, 40 for retaining a lip seal 26 when the member 30 temporarily disengages the lip seal 26.

At least one vent hole 42 is provided for enabling an energizing media to enter and exit a seal cavity 44. This should be apparent that this specialized gland is not only complex and costly but also limits the type of seal that may be utilized therein.

The present invention as shown in FIGS. 2a, 2b, 3a, 3b, 3c, 3d and 4–11 are self contained and require only a conventional rectangular seal gland for mounting.

Figure 2A:
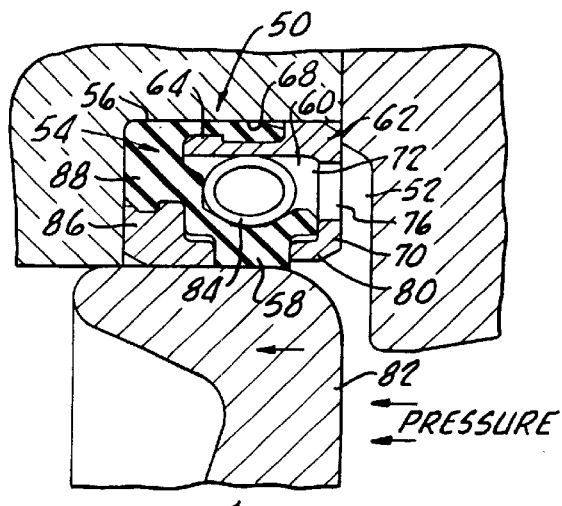
FIG. 2a is a cross sectional view of a self contained anti-blowout seal in accordance with the present invention generally showing a seal jacket, a retaining ring, biasing element, and a backup ring.

With reference to FIG. 2a, there is shown a seal 50 in accordance with the present invention configured for mounting in a rectangular seal gland 52. The seal 50 generally includes a seal jacket 54 having a static seal surface 56 and a dynamic seal lip 58 with a cavity 60 therebetween. The seal jacket 54 may be formed from PTFE, PTFE blend or any suitable polymetric material to provide suitable endurance and long seal life.

A retaining ring 62 is provided and disposed, in part, within and forming a wall of the cavity 60 by a finger portion 64 which is proximate the static seal surface 56 and provides a means for pressing the static seal surface 56 against a mounting surface 68. A depending portion 70 of the retaining ring 62 extends over a cavity opening and includes at least one vent hole 76 communicating with the cavity 60.

A ledge 80 extends from the retaining ring depending portion 70 and engages the dynamic seal lip 58 for preventing seal lip 58 blowout when a moving member 82 disengages the lip 5 and residual pressure applied through the opening 76 to the cavity 60 has not been relieved.

A canted coil spring 84 may be utilized as a biasing element which is disposed in the cavity 60 for forcing a dynamic seal lip 58 against a moving member 82.

A snap in back up ring 86 may be provided and disposed between a heel portion 88 of the seal jacket 54 for preventing the lip seal 58 from bending or extruding any additional or distance past the ledge 80 upon disengagement of the moving member 82.

The retaining ring 62 and backup ring 86 may be formed from any suitable material such as a metal or plastic material. The configuration of the seal 50 provides for self containment and the integral mounting of the retaining ring enables the seal 50 to be pressed into the gland 52 and maintain its position therein. The ring 62 along with the ledge 80 prevents any lip 58 blowout due to residual pressure and the seal cavity 60 when the moving member 82 disengages the lip 58. As hereinabove noted, the vent hole 76 enables a sealing media to enter and exit the seal cavity 60 as the seal is pressure energized.

Figure 2B:
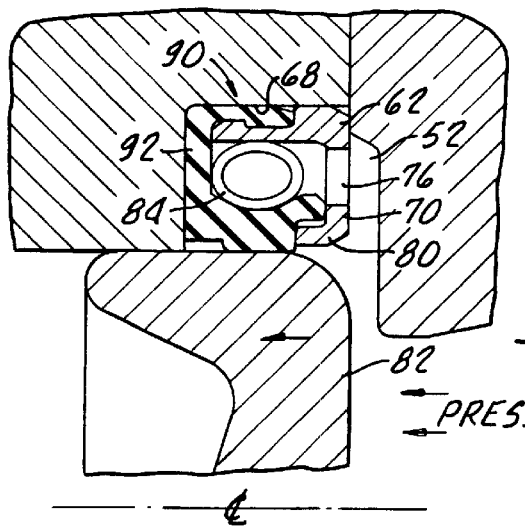
FIG. 2b is an embodiment of the present invention similar to that show in FIG. 2a without the backup ring.
Figure 3A:
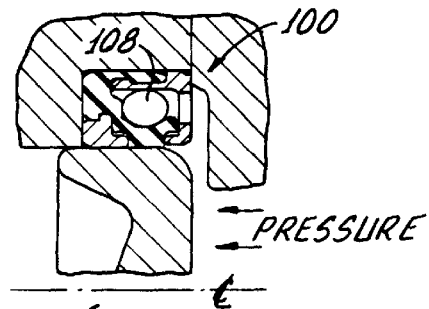
FIG. 3a is an embodiment of the present invention similar to shown in FIG. 2a utilizing an elastomeric o-ring as a biasing element.
Figure 3B:
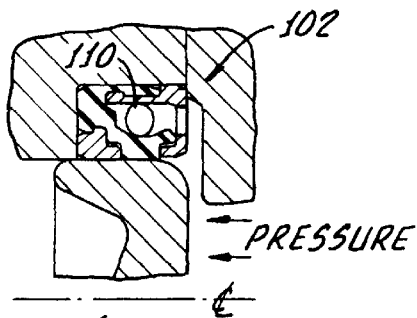
FIG. 3b is an embodiment of the present invention similar to that shown in FIG. 2a utilizing a spiral strip spring as a biasing element.
Figure 3C:
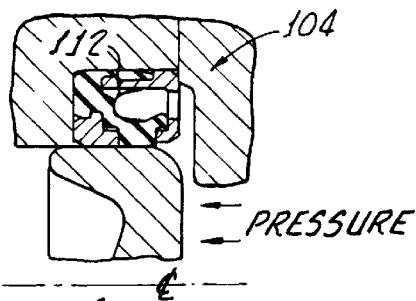
FIG. 3c is an embodiment of the present invention similar to that shown in FIG. 2a utilizing a leaf/finger spring as a biasing element.
Figure 3D:
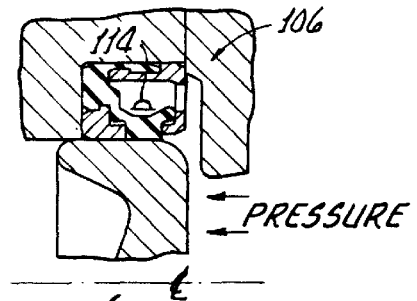
FIG. 3d is an embodiment of the present invention similar to that shown in FIG. 2a utilizing an extension garter spring as a biasing element.

The heel 88 of the seal 50 is retained from blow out by the snap-in backup ring 86. However, in some applications the snap in ring 88 may not be necessary, this embodiment 90 is shown in FIG. 2b. In this instance, the seal 90 may be very short or the pressures and conditions are less severe. As shown in FIG. 2b, the seal 90 and seal jacket 92 without the backup ring 86, otherwise, identical character references represent identical or substantially similar components of the seal 90 as shown in FIG. 2a.

With reference to FIGS. 3a–3d there is shown seal embodiments 100, 102, 104, 106 which are substantially similar to the seal 50 hereinabove described and shown in FIG. 2 utilizing respectably as biasing elements an elastomeric o-ring 108, a spiral strip spring 110, a leaf/finger spring 112, and an extension garter spring 114.

Figure 4:
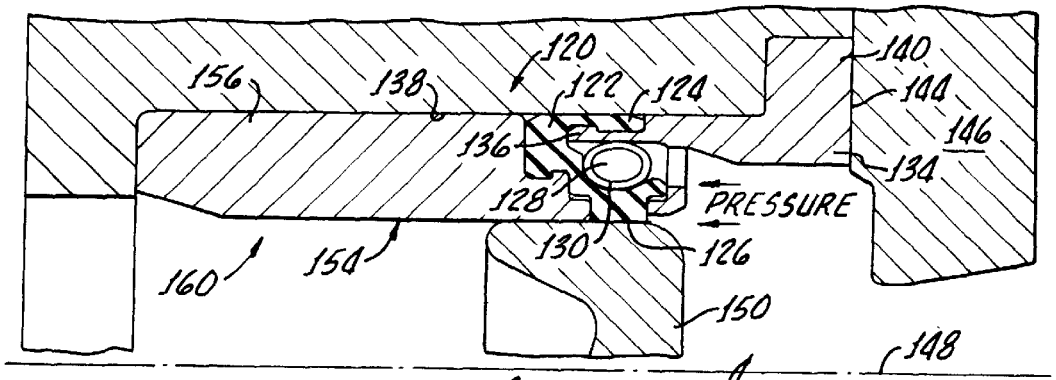
FIG. 4 is an embodiment of the present invention utilizing a backup ring which is extended in order to become part of a bearing surface for a moving member, such as a piston and a retaining ring which is extended to become part of the mounting system.
Figure 5:
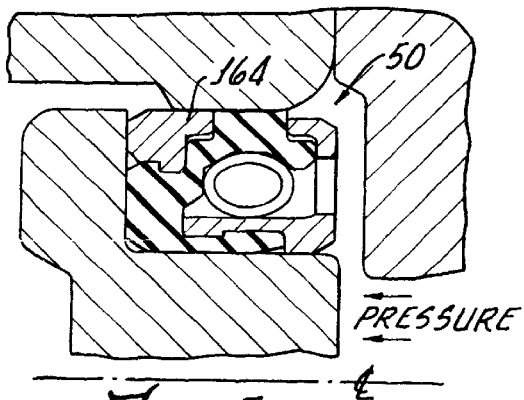
FIG. 5 is a cross sectional view of an embodiment of the present invention as it may be utilized as a self-contained anti-blowout seal for sealing on an outside diameter.

With reference to FIG. 4 there is shown another seal embodiment 120 having a seal jacket 122 with a static sealing surface 124 and a dynamic sealing lip 126 with a cavity 128 therebetween and an energizing spring 130 similar to that hereinabove described in connection with the seal 50 shown in FIG. 2.

In the embodiment 120 a retaining ring 134 includes a finger portion 136 for forcing the static sealing surface 124 against a mounting surface 138 and further includes an extended portion 149 for providing a bearing surface 144 against a housing 146 to prevent longitudinal movement of the seal 120 along an axis 148 of a moving member 150. In addition, a backup ring 154 includes a forward extension 156 and thus becomes, in combination with the retaining ring 134, a mounting system 160 for the seal 120. In this instance, a special mounting gland (not shown) is not required.

Figure 6:
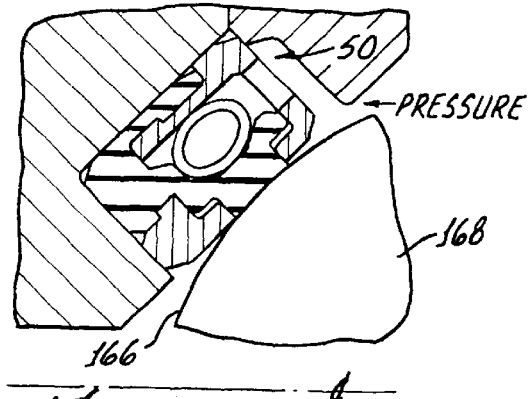
FIG. 6 is a cross sectional view of an embodiment similar to that shown in FIG. 2a utilized for sealing on an angled surface, such as a spherical ball valve.

With reference to FIGS. 5–8 the seal 50 is shown in various applications. Specifically, in FIG. 5 the seal 50 is shown for sealing against an outside surface 164. In FIG. 6 the seal 50 is shown as sealing and angled surface 166 as found on a spherical ball valve 168.

Figure 7:
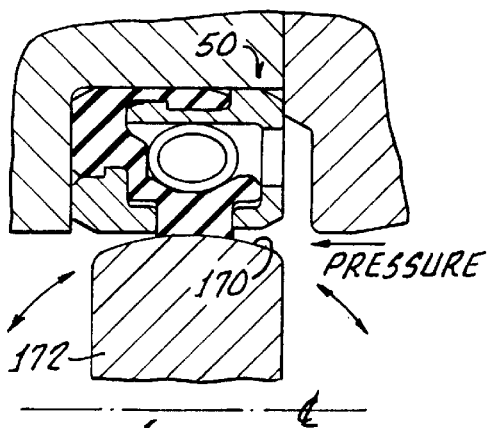
FIG. 7 is a cross sectional view of an embodiment of the present invention as it may be utilized on a partially engaging surface such as, for example, a butterfly valve.
Figure 8:
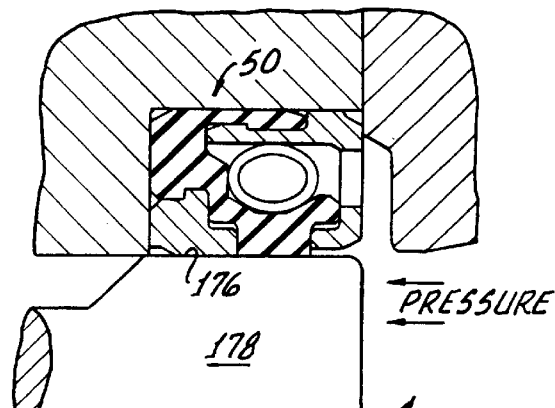
FIG. 8 is a self-contained anti-blowout seal in accordance with the present invention as it may be used for sealing on a stepped counter surface, such as, quick-disconnect couplings.

In FIG. 7 the seal 50 is shown on a partially engaging surface 170, such as found on a butterfly valve 172 and in FIG. 8 the seal 50 is shown as engaging a surface 176 on a quick-disconnect coupling 178.

Figure 9:
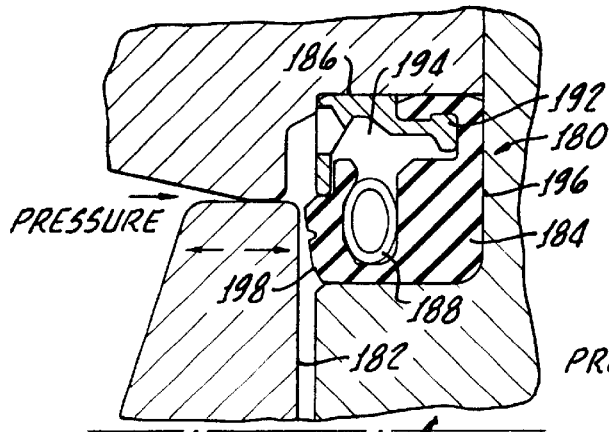
FIG. 9 is an embodiment of the present invention as it may be utilized as a self-contained anti-blowout seal for sealing in an axial direction, such as, for example as a face seal.

FIG. 9 shows a alternative embodiment 180 of the present invention for use in sealing an axial direction against a surface 182. This face seal 180 includes a jacket 184, retaining ring 186 and spring 188. The retaining 186 includes a finger 192 disposed within a cavity 194 between a static seal surface 196 and sealing lips 198. Operation of this seal 180 is identical to that described in connection with the seal 50 shown in FIG. 2a.

Figure 10:
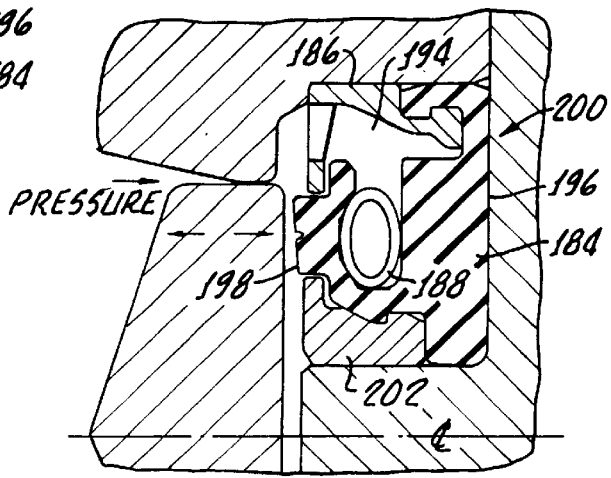
FIG. 10 is similar to the embodiment shown in FIG. 9 further including a back-up ring.

FIG. 10 shows a seal embodiment 200 similar to that shown in FIG. 9 further including a snap in backup ring 202 similar to the ring 86 described in FIG. 2a. Identical reference characters shown in FIG. 10 represent identical or similar elements hereinabove described in the embodiment 180 are shown in FIG. 9.

Figure 11:
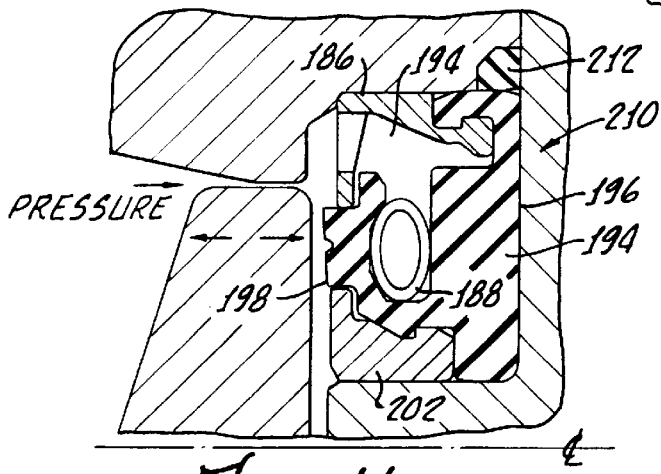
FIG. 11 is a self-contained anti-blowout seal in accordance with the present invention for sealing in an axial direction as a face seal utilizing a back-up ring and a static o-ring to further seal other areas behind the anti-blowout seal.

Another embodiment of the present invention is shown in FIG. 11, This embodiment 210 is similar to the embodiment 200 shown in FIG. 10 with identical character references representing identical or substantially similar elements of the embodiment 200. The embodiment 210 further includes a static o-ring 212 for providing additional seal to areas behind the anti-blowout seal 110.

Although there has been hereinabove described a self contained anti-blowout seal in accordance with the present invention for the purpose of illustrating the manner in which the invention may be used to advantage, it will be appreciated that the invention is not limited thereto. Accordingly, any all modifications, variations or equivalent arrangements which may occur to those skilled in the art should be considered within the scope that the invention is defined in the appended claims.

What is claimed is:

1. A self-contained anti-blowout seal comprising:
   a seal jacket having a static seal surface and a dynamic seal lip with a cavity therebetween, said cavity being open to one side of said seal jacket;
   a retaining ring, disposed in part, within said cavity and proximate said static seal surface for pressing said static seal surface against a mounting surface, said retaining ring having a surface, extending outside of said cavity, for bearing against said mounting surface and a depending portion extending over the cavity opening, said depending portion having at least one vent hole communicating with said cavity for enabling a sealing media to enter and exit said cavity as the seal is pressure energized;
   a ledge extending from the retaining ring depending portion and engaging said dynamic seal lip, for preventing seal lip blowout; and
   a biasing element disposed in said cavity for forcing said dynamic seal lip against a moving member.

2. The sealing according to claim 1 further comprising a snap-in backup ring disposed between a heel portion of said seal jacket and said moving member for preventing the seal lip from bending past said ledge.

3. The seal according to claim 1 whereas said seal jacket is configured for mounting in a rectangular seal gland.

4. The seal according to claim 3 wherein said biasing element comprise a canted coil spring.

5. The seal according to claim 3 wherein said biasing element comprises an elastomer o-ring.

6. The seal according to claim 3 wherein said biasing element comprises a spiral strip spring.

7. The seal according to claim 3 wherein said biasing element comprises a leaf spring.

8. The seal according to claim 3 wherein said biasing element comprise an extension garter spring.

9. The seal according to claim 3 wherein said retaining ring further comprise a biasing surface for preventing longitudinal movement of the seal.

10. A self-contained anti-blowout seal comprising:
    a seal jacket having a static seal surface and a dynamic seal lip with a cavity therebetween, said cavity being open to one side of said seal jacket;
    a retaining ring, disposed in part, within said cavity and proximate said static seal surface for pressing said static seal surface against a mounting surface, said retaining ring having a surface, extending outside of said cavity, for bearing against said mounting surface, a biasing surface for preventing longitudinal movement of the seal and a depending portion extending over the cavity opening, said depending portion having at least one vent hole communicating with said cavity for enabling a sealing media to enter and exit said cavity as the seal is pressure energized;
    a snap-in backup ring disposed between a heel portion of said seal jacket and said moving member for preventing the seal lip from bending toward said moving member;
    a ledge extending from the retaining ring depending portion and engaging said dynamic seal lip, for preventing seal lip blowout; and
    a biasing element disposed in said cavity for forcing said dynamic seal lip against a moving member.

11. The seal according to claim 10 wherein said retaining ring further comprises a biasing surface for preventing longitudinal movement of the seal.

12. The seal according to claim 11 wherein said backup ring further comprises a body portion extending outside of said seal jacket for holding said static seal surface against the mounting surface.

13. The seal according to claim 12 whereas said seal jacket is configured for mounting in a rectangular seal gland.

14. The seal according to claim 13 wherein said biasing element comprise a canted coil spring.

15. The seal according to claim 13 wherein said biasing element comprises an elastomer o-ring.

16. The seal according to claim 13 wherein said biasing element comprises a spiral strip spring.

17. The seal according to claim 13 wherein said biasing element comprises a leaf spring.

18. The seal according to claim 13 wherein said biasing element comprises an extension garter spring.

* * * * *